United States Patent
Dessouky et al.

(10) Patent No.: US 9,978,019 B2
(45) Date of Patent: May 22, 2018

(54) SYSTEM AND METHOD FOR IMPROVING EFFICIENCY OF CONTAINMENT DETERMINATION PROCESSING

(71) Applicant: TECHNOCOM CORPORATION, Carlsbad, CA (US)

(72) Inventors: Khaled I. Dessouky, Studio City, CA (US); John Thomas Moring, Encinitas, CA (US); Mario Proietti, Fullerton, CA (US)

(73) Assignee: TECHNOCOM CORPORATION, Carlsbad, CA (US)

( * ) Notice: Subject to any disclaimer, the term of this patent is extended or adjusted under 35 U.S.C. 154(b) by 1025 days.

(21) Appl. No.: 14/264,655

(22) Filed: Apr. 29, 2014

(65) Prior Publication Data
US 2015/0310348 A1    Oct. 29, 2015

(51) Int. Cl.
G01C 9/00 (2006.01)
G01C 17/00 (2006.01)
G01C 19/00 (2013.01)
G06N 7/00 (2006.01)

(52) U.S. Cl.
CPC .................................. *G06N 7/005* (2013.01)

(58) Field of Classification Search
CPC ....... H04W 4/02; H04W 4/023; H04W 4/008; H04W 64/00; H04W 4/021; H04W 4/028; H04W 12/06; H04W 4/027; H04W 4/025; H04W 4/22; H04W 4/026; H04W 84/12; H04W 12/12; H04W 24/02; H04W 24/08
See application file for complete search history.

(56) References Cited

U.S. PATENT DOCUMENTS

| 2004/0067759 | A1* | 4/2004 | Spirito | H04W 64/00 455/456.1 |
| 2006/0009223 | A1* | 1/2006 | Kiviranta | H04W 64/00 455/436 |
| 2011/0207455 | A1* | 8/2011 | Lee | H04W 64/003 455/434 |

* cited by examiner

*Primary Examiner* — Roy Y Yi
(74) *Attorney, Agent, or Firm* — Lewis Roca Rothgerber Christie LLP

(57) ABSTRACT

Method for calculating whether an actual location of a target device is on one side of a boundary zone includes: receiving an estimated location of the target device; receiving a desired confidence level; forming a first circle with radius D, centered at the estimated location, where D is the shortest distance from the estimated location to the boundary zone; forming a second circle with radius R', centered at the estimated location, wherein R' is determined in such a way so that a likelihood that the actual location is inside the second circle equals or exceeds the desired confidence level; forming an angle with an apex at the estimated location and rays passing through two closest points to the estimated location where the second circle intersects the boundary zone; and using a size of an annulus formed by the first circle, the second circle, and the rays to estimate whether the actual location lies on the same side of the boundary zone.

12 Claims, 17 Drawing Sheets

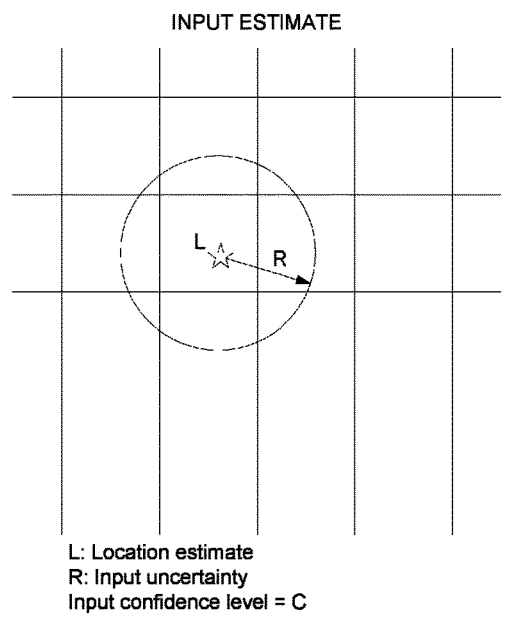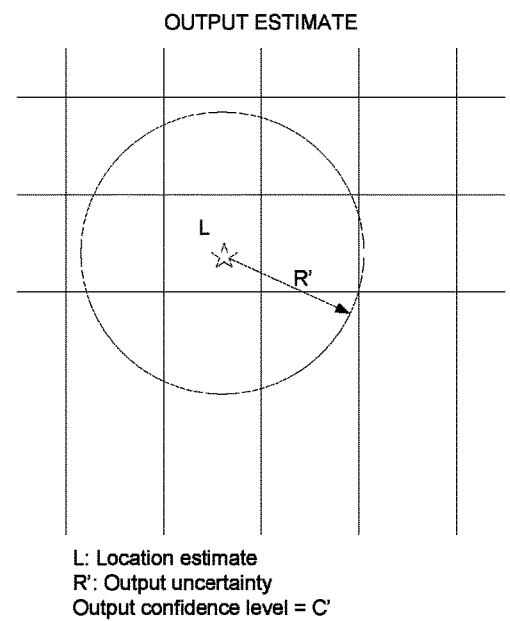
FIG. 3A     FIG. 3B

OUTPUT ESTIMATES

L1, L2: Location estimates
A1, A2: Uncertainty
Normalized confidence = CN

RECONCILED ESTIMATE

L: Reconciled location estimate
A: Reconciled uncertainty
Normalized confidence = CN

SYSTEM AND METHOD FOR IMPROVING EFFICIENCY OF CONTAINMENT DETERMINATION PROCESSING

FIELD OF INVENTION

The present invention relates to the field of mobile wireless devices and location based services.

BACKGROUND

The technology for determining and using the location of mobile devices has become widespread. Techniques employed use satellite (e.g., GPS) or terrestrial multilateration, or proximity detection (e.g., by knowledge of nearby cell towers or Wi-Fi hotspots). The result is a great convenience for users. With the proliferation of location-capable user equipment, applications have arisen that rely on the determination of whether a user's location is inside or outside a defined area, i.e., containment. An example is an application that tracks a delivery or service vehicle and generates an alert when it is within a certain radius of its destination point.

A location determination service, such as one used to estimate the location of mobile devices within a cellular telephone network, may generate a location estimate of a user (e.g., latitude and longitude), with a specified input confidence level and associated uncertainty. The input confidence level is a probability estimated, by the location system, that the actual device location is within the associated uncertainty area. Different location determination technologies may use different confidence levels, as well as different uncertainty shapes, with the most common uncertainty shape being a circle around the obtained location. The radius of such an uncertainty circle, or the semi-major axis of an uncertainty ellipse, is commonly referred to as the uncertainty value. A user of the location data may desire knowledge, with a specific probability, or likelihood, that the mobile device is inside or outside a defined geographic boundary.

Frequently, the need to assess whether a mobile device is inside or outside a defined geographic boundary is required in real-time. Also, a multitude of devices may need to be monitored simultaneously against a multitude of geographic boundaries. The requirement to assess a large number of devices against many boundaries can be computationally intensive. Being able to provide results of such assessments with as little delay as possible further adds computational demands on processors doing the assessment. This can place large and impractical memory, processing power and input/output demands on the associated processing systems. Minimizing the computational intensity of such assessments helps to reduce latency, increase processing capacity and minimize processing systems required. In other words, in conventional systems, the containment decision is often made in a processing-intensive manner by calculating the probability that the actual location lies on one side of the boundary, given the location estimate in combination with other factors, such as the uncertainty, the associated confidence level, and knowledge of the statistical performance of the location determination technology.

SUMMARY

The present invention employs a series of simplified calculations that in many cases will produce a usable IN/OUT decision without resorting to the intensive (in time and processing power) calculations above. Specifically, several algorithms are described using simplified geometries to estimate the likelihood that the actual location falls to one side or the other of the boundary area.

In some embodiments, the present invention is a computer implemented method for calculating whether an actual location of a target device is on one side of a boundary zone. The method includes: receiving an estimated location of the target device; receiving a desired confidence level; forming a first circle with radius D, centered at the estimated location, where D is the shortest distance from the estimated location to the boundary zone; forming a second circle with radius R', centered at the estimated location, wherein R' is determined in such a way so that a likelihood that the actual location is inside the second circle equals or exceeds the desired confidence level; forming an angle with an apex at the estimated location and rays passing through two closest points to the estimated location where the second circle intersects the boundary zone; and using a size of an annulus formed by the first circle, the second circle, and the rays to estimate whether the actual location lies on the same side of the boundary zone as the estimated location.

In some embodiments, the present invention is a computer implemented method for calculating whether an actual location of a target device is on one side of a boundary zone. The method includes: receiving an estimated location L of the target device; receiving a desired confidence level; determining a distance D, where D is the shortest distance from the estimated location to the boundary zone; forming a circle with radius R', centered at the estimated location, wherein R' is determined in such a way so that a likelihood that the actual location is inside the circle equals or exceeds the desired confidence level; forming a secant, perpendicular to D, passing through the point where D intersects the boundary zone; and using a size of an area bounded by the circle and the secant to estimate whether the actual location lies on the same side of the boundary zone as the estimated location.

In some embodiments, the desired confidence level may be an estimated probability that the actual location of the target device is within an uncertainty zone, which may be a constant for estimated locations received from a particular source.

In some embodiments, a second (or also a third) estimated location of the target device may be received; and one of the received estimated locations may be selected as the estimated location for further processing, based on cost or quality of the source from where the estimated locations are received.

BRIEF DESCRIPTION OF THE DRAWINGS

FIGS. 3A and 3B illustrate an input estimate and the resulting output estimate with an adjusted confidence level and uncertainty radius, according to some embodiments of the present invention.

DETAILED DESCRIPTION

One technique employed by the present invention is the ability to trade increased confidence for a larger uncertainty area, and vice versa. By increasing the size of an uncertainty area, the present invention increases the probability (and therefore the confidence) that the user is within the uncertainty area, while by decreasing the uncertainty area, the invention decreases the confidence. The statistical distribution of actual user locations compared to location estimates generated by the location determination technology is used to execute an accurate scaling of one parameter as the other is adjusted.

For example, for trilateration type systems (e.g., GPS, time of arrival), one may assume that the error in the X and Y directions are normal (except at the tails), because of the underlying physics relating to independent sources of time measurement error. Consequently, the resulting uncertainty statistics follow a chi-squared distribution with two degrees of freedom. This results in a direct relationship between confidence and uncertainty radius, allowing scaling between those two variables. Each location determination technology has statistical behavior that may be quantified by empirical measurement or analysis, and leveraged to help determine a relationship between confidence and uncertainty.

Figure 1:
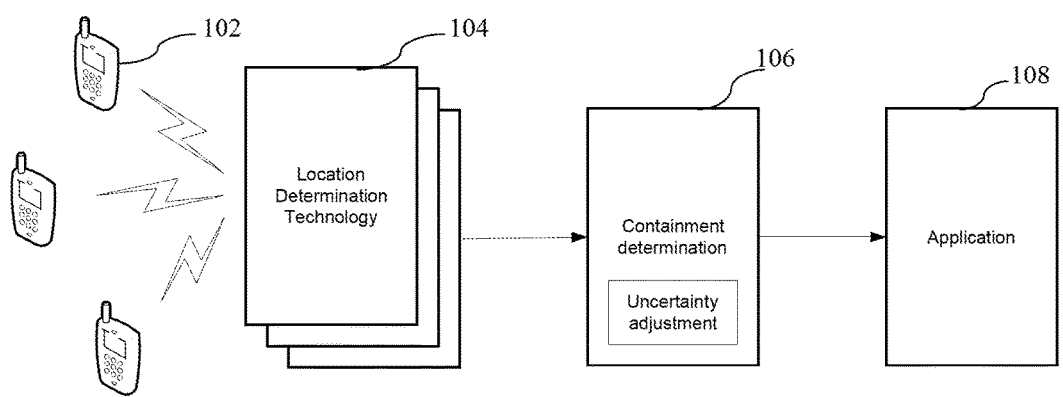
FIG. 1 is an exemplary block diagram of a wireless location system in which a containment determination function resides, according to some embodiments of the present invention.

FIG. 1 is an exemplary block diagram of a wireless location system in which a containment determination function resides, according to some embodiments of the present invention. As shown, a location determination technology module 104 generates a location estimate for a user, e.g., a handset, 102, using conventional methods. The task of the containment determination process 106 is to operate on the location estimate and generate a determination as to whether the user's actual location is within a defined boundary area Z. This information is to be consumed subsequently by the application 108, such as workforce management or zone based advertising. Based on the value of the location estimate from the location determination module 104, it can be determined whether the location estimate lies inside or outside Z. However, the actual location may differ from the location estimate sufficiently that it would fall on the other side of the boundary. Therefore, more extensive processing is required by the containment determination process 106 to generate a definitive conclusion with a given level of confidence. The present invention may be programmed to provide an IN/OUT decision when the likelihood that the determination is correct exceeds a given level. This likelihood may be application-dependent.

Figure 2:
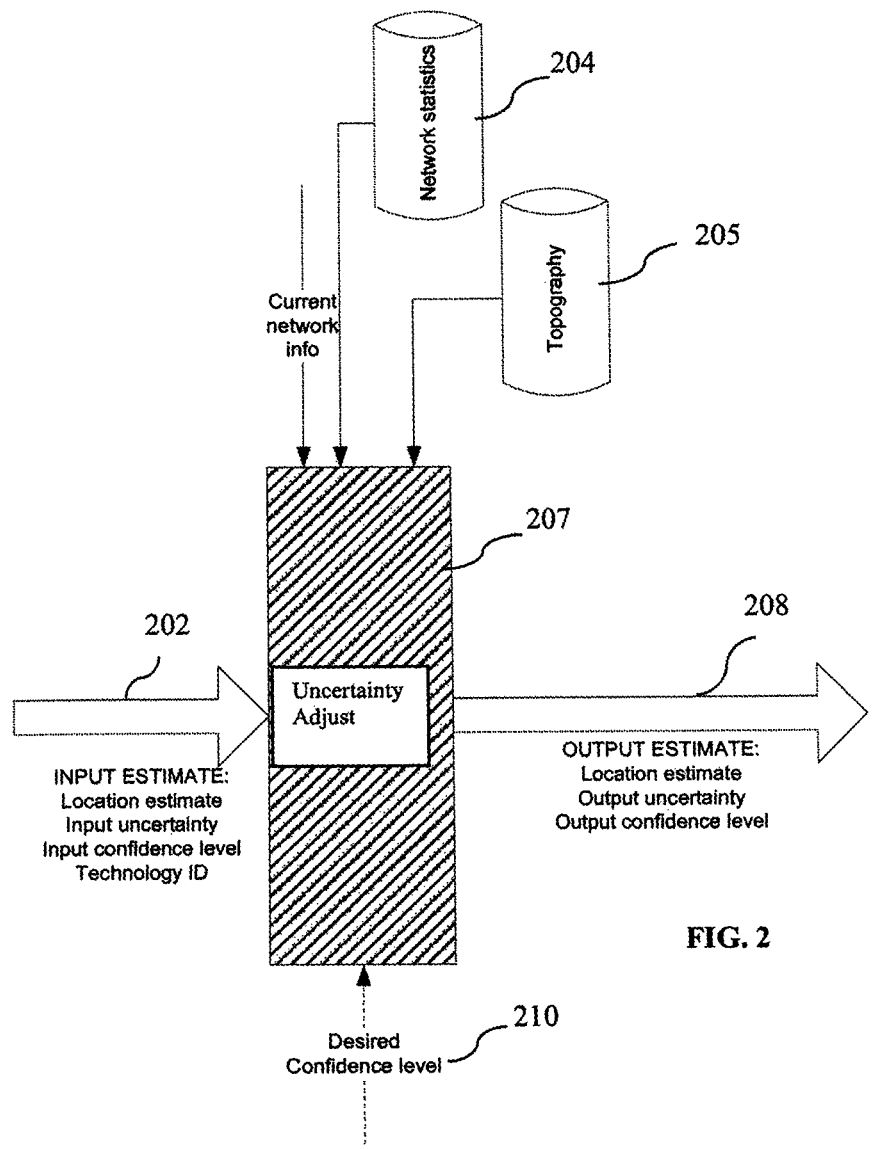
FIG. 2 shows a block diagram of an uncertainty adjustment function, according to some embodiments of the present invention.

FIG. 2 shows a diagram of an uncertainty adjustment process, according to some embodiments of the present invention. An input estimate 202 is received, e.g., from a system that collects measurements from a mobile wireless device and generates an estimate of its actual location. The input estimate includes a location estimate L, and an input uncertainty level R. In other instances the input uncertainty may be implicit or otherwise known. The input estimate may contain an input confidence level C and a location determination technology identifier, or these parameters may be known a priori by the present invention.

An uncertainty adjustor 207, for example, a processor, may also have access to historical location determination network performance statistics 204, topography data 205 or information on the current configuration of the location determination network 206. Network performance statistics may include such information as benchmarks of the system accuracy and estimated vs. actual locations for a given area or set of operating conditions. Examples of topography data are population centers, transportation corridors, and geographic features such as bodies of water. Location network configuration may include a level of location infrastructure deployment in an area or recent equipment outages, either of which affect accuracy.

The uncertainty adjustor 207 may also have access to a preselected output confidence level, e.g., one selected by an application based on its own needs. Alternately, the uncertainty adjustment function may calculate or select the output confidence level based on some knowledge of how the output estimate 208 will be used. For example, an uncertainty adjustment function might have three possible output confidence level values. A 95% value would be provided to user applications such as needing high confidence, such as navigation, whereas a lower value of 80% or 65% could be provided in output estimates sent to less demanding applications, such as those that search for nearby points of interest.

An objective of the uncertainty adjustment function is to generate an output uncertainty 208 for the location estimate, consistent with the output confidence level. If the output confidence level is higher than the input confidence level, the output uncertainty will generally be larger than the input uncertainty, as described above and illustrated in FIGS. 3A and 3B. Conversely, if the output confidence level is lower than the input confidence level, the output uncertainty will generally be smaller than the input uncertainty.

FIGS. 3A and 3B illustrate the relation between an input estimate, e.g., the location of a mobile wireless device, to an output estimate with adjusted confidence and uncertainty. The input estimate includes a location estimate (at X/Y coordinates labeled L), an input uncertainty (labeled R and shown as a circle around L), and an input confidence level C. The confidence level may be presented as a percentage, e.g., C=90%. This confidence level indicates a 90% likelihood (based on the best prediction of the location determination technology) that the actual location is within the area represented by R. The output estimate generated by the present invention retains the location estimate L, but adjusts the uncertainty and confidence level. The invention may use historical statistical information as well as on-going real-time data collection to adaptively adjust scaling factors for each location determination technology. This statistical data may be used when adjusting the confidence value to be consistent with a new uncertainty radius, or when adjusting the uncertainty radius to be consistent with a different confidence level. The location estimate itself is typically not adjusted, with possible exceptions described later. The location estimate is assumed to be the best available using whatever location determination means are implemented within the serving network.

For example, a higher output confidence level, say C'=95%, might be desired. The invention in this case increases the output uncertainty to a larger value R', such that there is a 95% likelihood (based on the best estimation of the invention) that the actual location is within the area represented by R'. The new output uncertainty may be calculated based on an assumed normal distribution of device locations, or may take other factors into account.

The invention may apply scaling and weighting to further refine the output uncertainty based on topographic features and/or network topology in vicinity of the location estimate, using some or all of the following: prior history/knowledge of data for each technology/network, ongoing updates for network, device, technology changes, geographic/topographic/morphological variations, and comparison among sources (technologies/networks) of location data.

Figure 4:
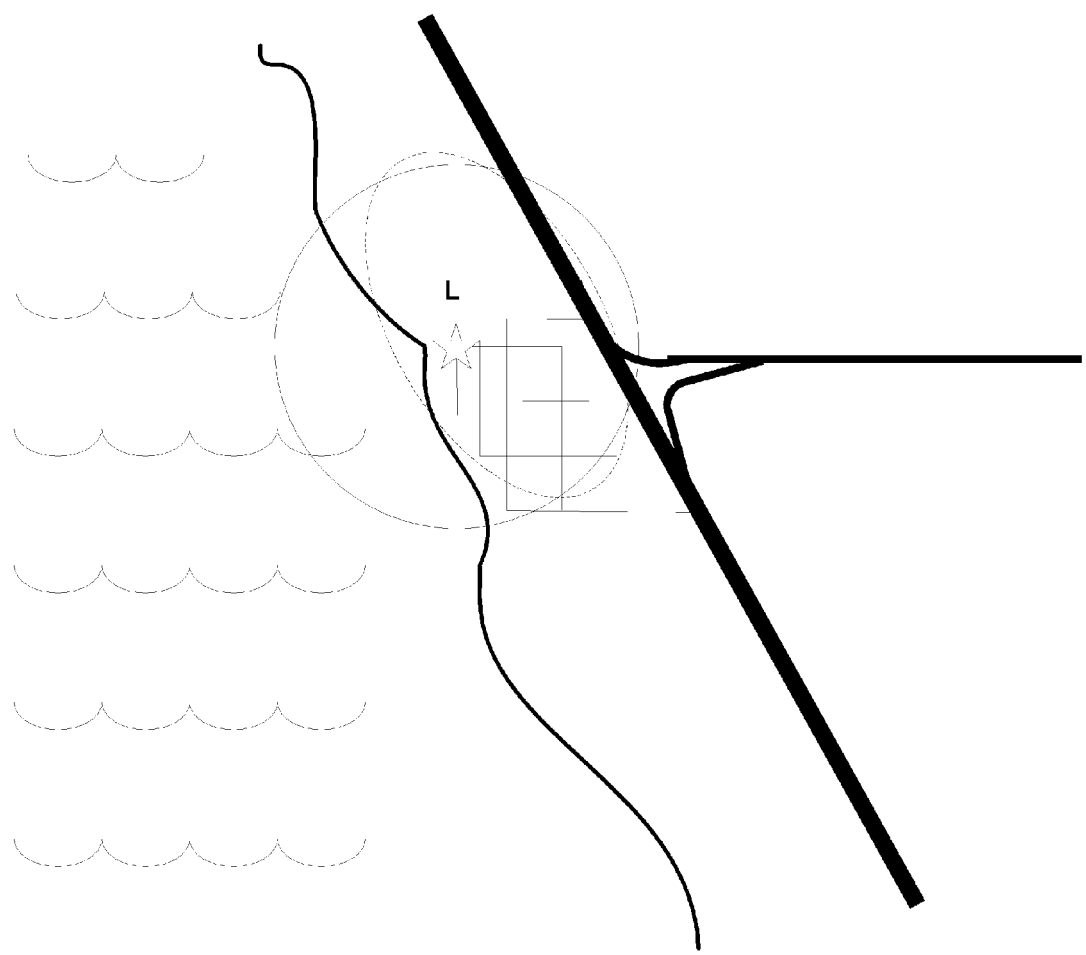
FIG. 4 illustrates the adjustment of an uncertainty area near a topographic feature, according to some embodiments of the present invention.

The following describes a case where the location estimate remains unchanged by the uncertainty adjustment function, and the input uncertainty and the output uncertainty geometries are centered on the location estimate L. This may not always be the case. Consider for example FIG. 4. As shown, input estimate has a location estimate L with a circular input uncertainty. The location estimate falls near a body of water. In adjusting the uncertainty in accordance with the output confidence level, in this example the algorithm has also adjusted the geometry of the output uncertainty to be an ellipse shifted landward, since it predicts that the actual location is most likely on land. The location estimate itself could be adjusted in some cases, e.g., to account for the fact that a user is more likely to be found in a population center or on a highway, than in a field or ocean.

Containment Determination Function

An objective of the containment determination function is to make a decision as to whether the actual location is contained within a certain geographic boundary Z, based on the uncertainty R and confidence level C associated with the location estimate L. The containment function considers the likelihood threshold T required by the application consumer of the system output, and may also make use of topography data. The geographic boundary may comprise of a circle (a point and radius), a more general area or a complex polygon representation.

The containment determination function may be used to estimate with high likelihood whether the actual location of the device is within the geographic boundary for a general boundary shape, as described following. Several stages of increasing processing complexity are described; a conclusive IN/OUT determination at any stage means the subsequent stages need not be performed.

Figure 5:
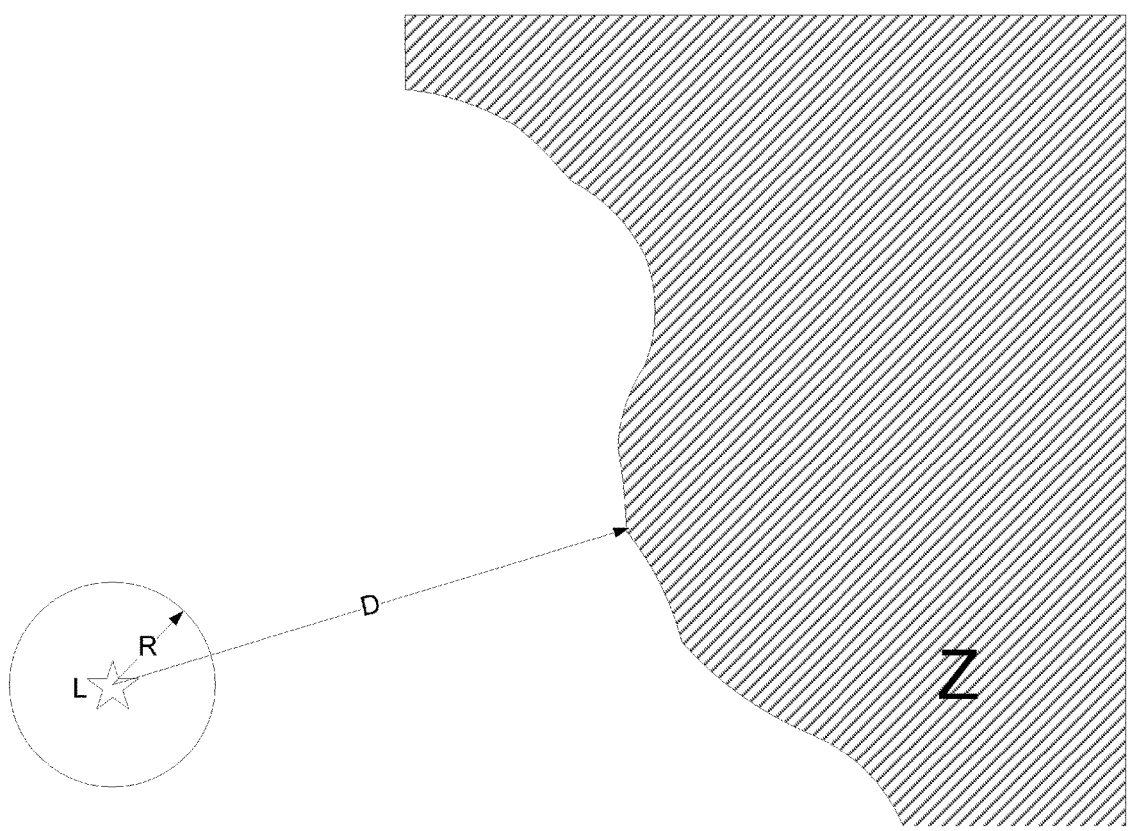
FIG. 5 illustrates geometry associated with a stage 1 containment determination, according to some embodiments of the present invention.

FIG. 5 shows the location estimate L, the geographic boundary Z, and the distance D from L to the closest point on Z. Using knowledge of the set of location sources that are available to provide location estimates, we can determine a default multiplier N that will "guarantee" that an actual location represented by a location estimate is IN or OUT of a boundary for a given likelihood decision threshold T. In one example, if all location sources provide at least 67% confidence and we may determine based on known distribution of location errors, that for T=95%, a factor of N=2 encompass 95+% of actual location possibilities.

Figure 6:
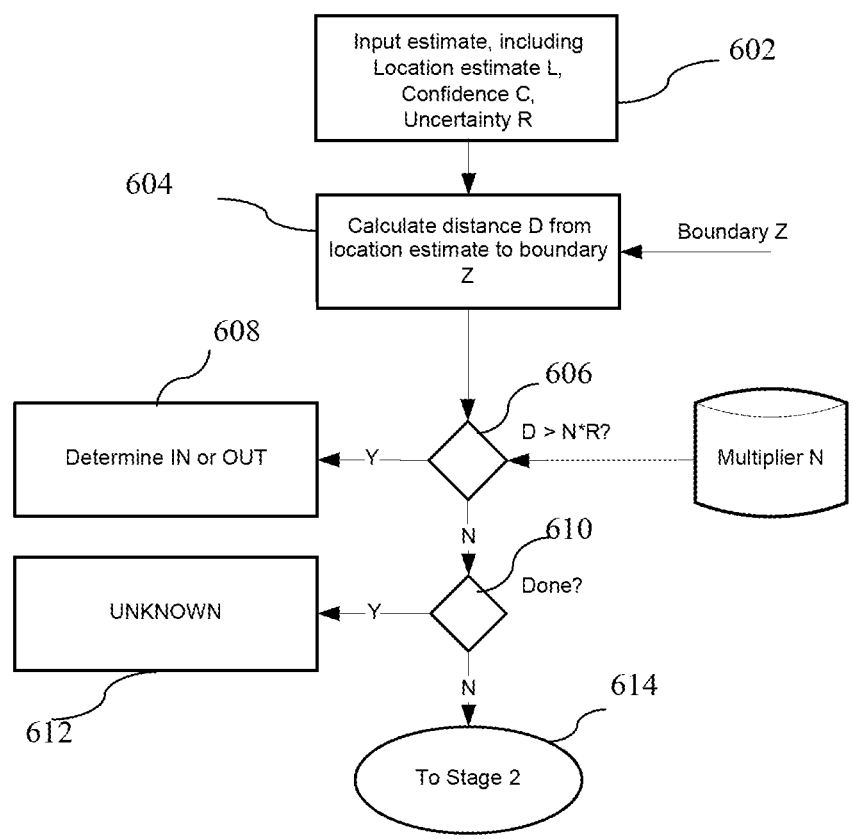
FIG. 6 illustrates an exemplary process flow associated with a stage 1 containment determination, according to some embodiments of the present invention.

FIG. 6 illustrates an exemplary process flow, implemented by one or more processors, associated with a stage 1 containment determination, according to some embodiments of the present invention. As depicted, an input estimate is received by the containment determination function, in block 602. This estimate is produced by some location determination technology. The estimate includes a point L (e.g., lat./long., X/Y), a surrounding uncertainty zone (e.g., an error radius R), and a confidence value C (the estimated probability that the actual device location is within the uncertainty zone). Based on the system configuration developed with knowledge of the available location determination technologies, the invention may know that the confidence values input to the algorithm always fall within a known range, e.g., 67% to 90%. Parts of this input estimate may be received directly from the location determination technology; others may be received indirectly. Certain information, e.g., confidence, may be constant for all input estimates from a particular source, and may therefore be stored.

The distance D from the location estimate L to the closest point on the boundary Z is calculated, in block 604 and compared to the value of N*R, in block 606, where N is the default multiplier (as described above). If D exceeds N*R, one can state that the actual location falls, with high likelihood, on the same side of the border (zone) as the location estimate and thus can be definitively identified (as far as the application is concerned) as IN or OUT (608). This scenario is graphically visualized in FIG. 5, in which, the location L is within the circle with the radius R. If D exceeds N*R, in 606 it is determined that the process is done (608). If D does not exceed (or is equal to) N*R, then in block 610, it is determined whether the process is done (e.g., based on the needs of the consuming application). If done, the actual location could not be determined with the given confidence and is therefore indicated as unknown, in block 612. This result is passed to the consuming application and the process terminates.

If D does not exceed N*R in stage 1 (606) and the process is not determined to be done (610), the process does not generate a definitive decision as to whether the actual location falls on the same side of the border as the estimate, and resorts to more intensive processing.

Figure 7:
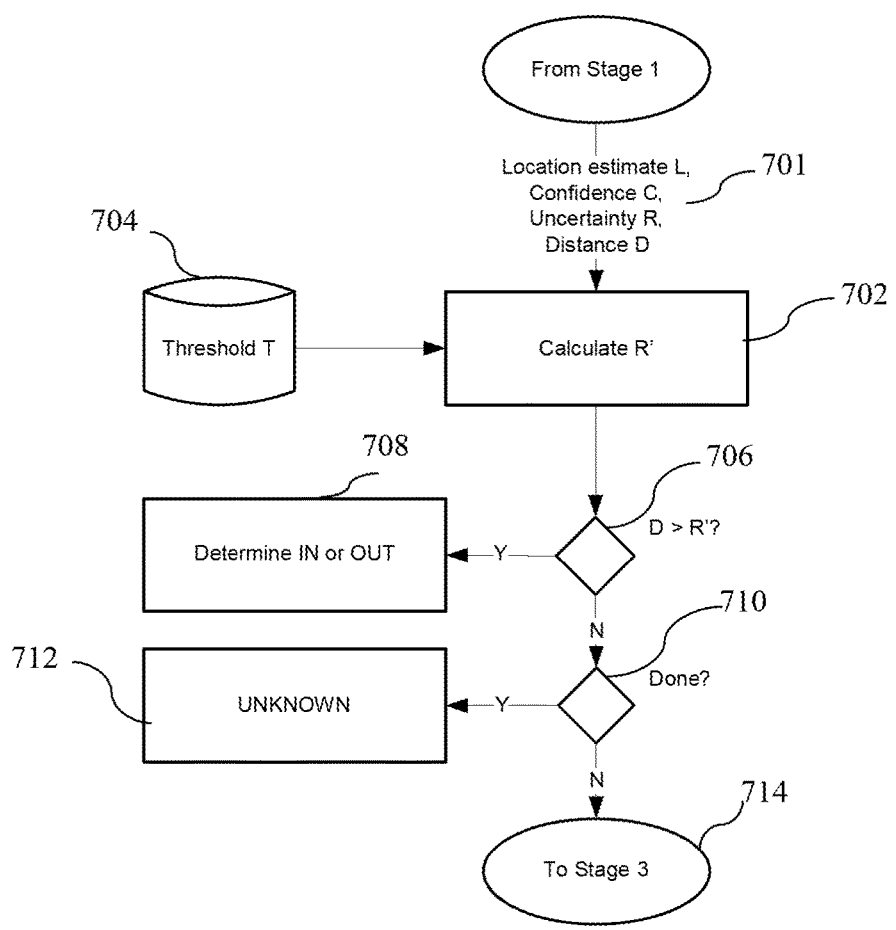
FIG. 7 illustrates an exemplary processing flow associated with a stage 2 containment determination, according to some embodiments of the present invention.

FIG. 7 illustrates an exemplary processing flow, implemented by one or more processors, associated with a stage 2 containment determination, according to some embodiments of the present invention. In block 701, the process revisits the location estimate and uses C, R, and the boundary Z to more accurately estimate the likelihood that the actual locate is IN/OUT of the boundary, using an adjusted uncertainty radius R', which is calculated in block 702.

Figure 8:
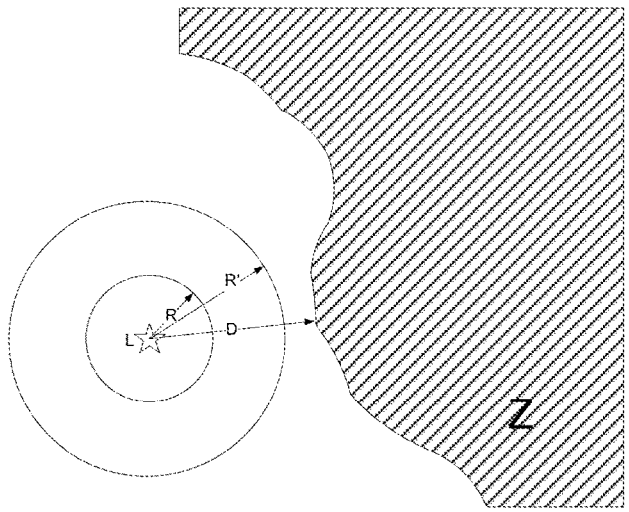
FIG. 8 illustrates geometry associated with a stage 2 containment determination, according to some embodiments of the present invention.

The process then determines or selects a confidence value threshold T 704 for accepting an IN/OUT decision, e.g., 90%, for the particular application user of the system output. The process calculates, based upon the characteristics of the location system providing the location estimate (e.g., using Chi Square characteristics), a new uncertainty radius R' corresponding to the desired confidence threshold T. The system may use different confidence threshold values for different applications, or classes of applications. Now a definitive IN/OUT decision can be made if D>R'. This is shown in FIG. 8, where the actual location is determined to be outside Z. Stage 1 accounts for the fact that location estimates may be received with a range of confidence values. Stage 2 in the invention accounts for the specific confidence associated with the location estimate in hand, and the decision confidence threshold required by the specific application.

In block 706, the distance D is compared to the radius R' and if D>R', then the process determines an IN/OUT decision, in block 708. If not, the process checks to see of it is done (e.g., based on the needs of the consuming application) in block 710. If the process is done, the location is indicated as unknown, in block 712. If D does not exceed R' (706) and the process is not deemed done (710), the process does not generate a definitive decision as to whether the actual location falls on the same side of the border as the estimate, and resorts to more processing (Stage 3), in block 714.

In other words, on reaching a definitive decision, the result may be passed to the consuming application, and the process terminates, in block 712, otherwise the process may continue to stage 3 processing, in block 714.

Figure 9:
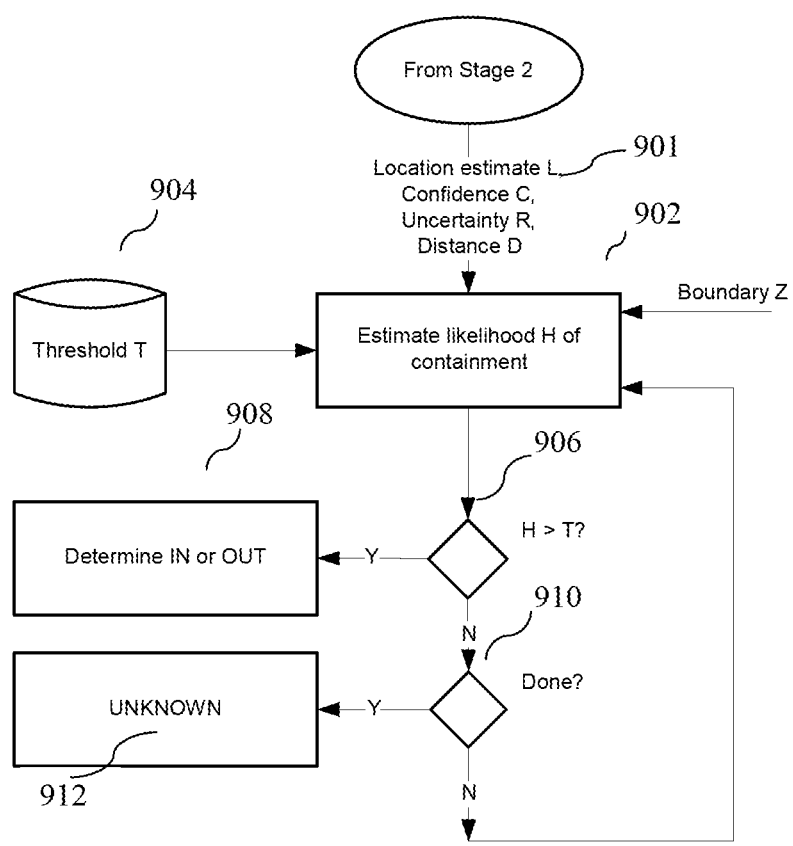
FIG. 9 illustrates an exemplary processing flow associated with a stage 3 containment determination, according to some embodiments of the present invention.

FIG. 9 illustrates an exemplary processing flow associated with a stage 3 containment determination, according to some embodiments of the present invention. In stage 3, increasingly more accurate and increasingly more processing-intensive containment determination algorithms may be invoked. If one technique does not yield a definitive containment decision, the next technique may be invoked until a definitive decision is made, or all the available algorithms have been exhausted and a non-definitive result must be output. One or more of the following methods may be used, as well as alternative methods not described.

Secant Method of Estimation

Figure 10:
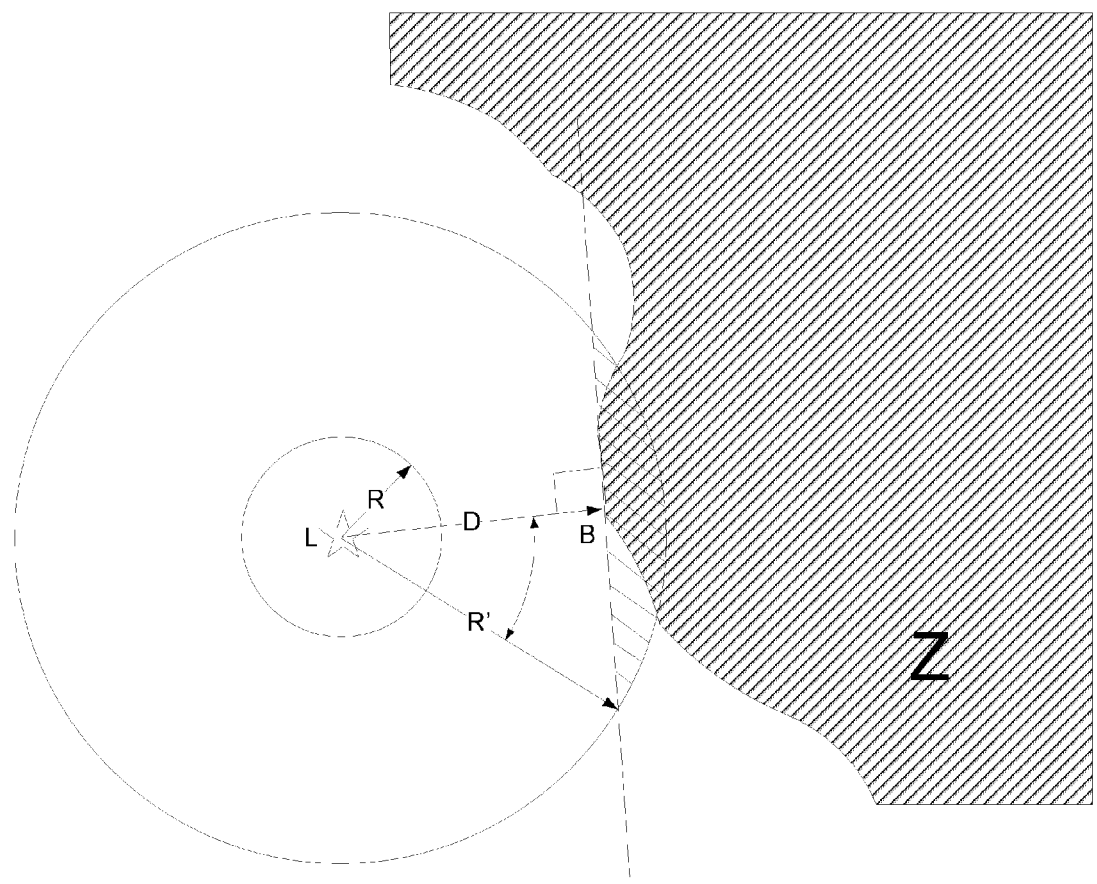
FIG. 10 illustrates details of an example where the secant method is used, according to some embodiments of the present invention.

As shown in FIG. 10, a secant method may be used to generate an estimated likelihood that the actual location is inside or outside the boundary, where that likelihood may then be compared to the confidence threshold T. This applies to circular uncertainty areas and may be applied to a general boundary shape, as shown in FIG. 10. Here again, L is the location estimate. Radius R represents the uncertainty at the confidence level C of the location estimate. Z is a general geographic boundary. B is the point on the geographic boundary nearest to L, and D is the distance between the B and L. R' is the radius calculated in stage 2 based on the confidence threshold T, such that the likelihood that the actual location lies inside the R' circle is T.

Referring back to FIG. 9, in block 901, the process revisits the location estimate and uses C, R, and the boundary Z to more accurately estimate the likelihood that the actual locate is IN/OUT of the boundary, using an estimate H of the likelihood of containment, which is calculated in block 902.

The estimate H of the likelihood of containment can be calculated as follows. Construct the secant of the R' circle, passing through and perpendicular to the line segment BL, shown in FIG. 10. The secant splits the uncertainty circle into two portions and the proportion of actual location within T on each side of the boundary is approximated by the proportion of the circle area on each side of the secant. This proportion is a function of the triangles and arcs created by the secant.

The process also considers that there is (1−T) likelihood that the actual location lies outside the uncertainty circle R'. Some fraction F of (1−T) may be allocated to the likelihood that the actual location lies outside the circle and on the same side of the boundary as L. For example, we could set F=0.5. Alternately, a method of assigning a proportional likelihood to the area outside the circle, as described later under the heading of Alternate method for estimating outlying points, may be used.

H is the sum of the likelihood of the two likelihoods described above (inside the circle minus the secant-defined area, plus outside the circle scaled by F.) In block 906, if H is greater than the decision threshold T, determined or obtained from a storage location 904, a definitive IN/OUT decision can be output, in block 908.

Figure 11:
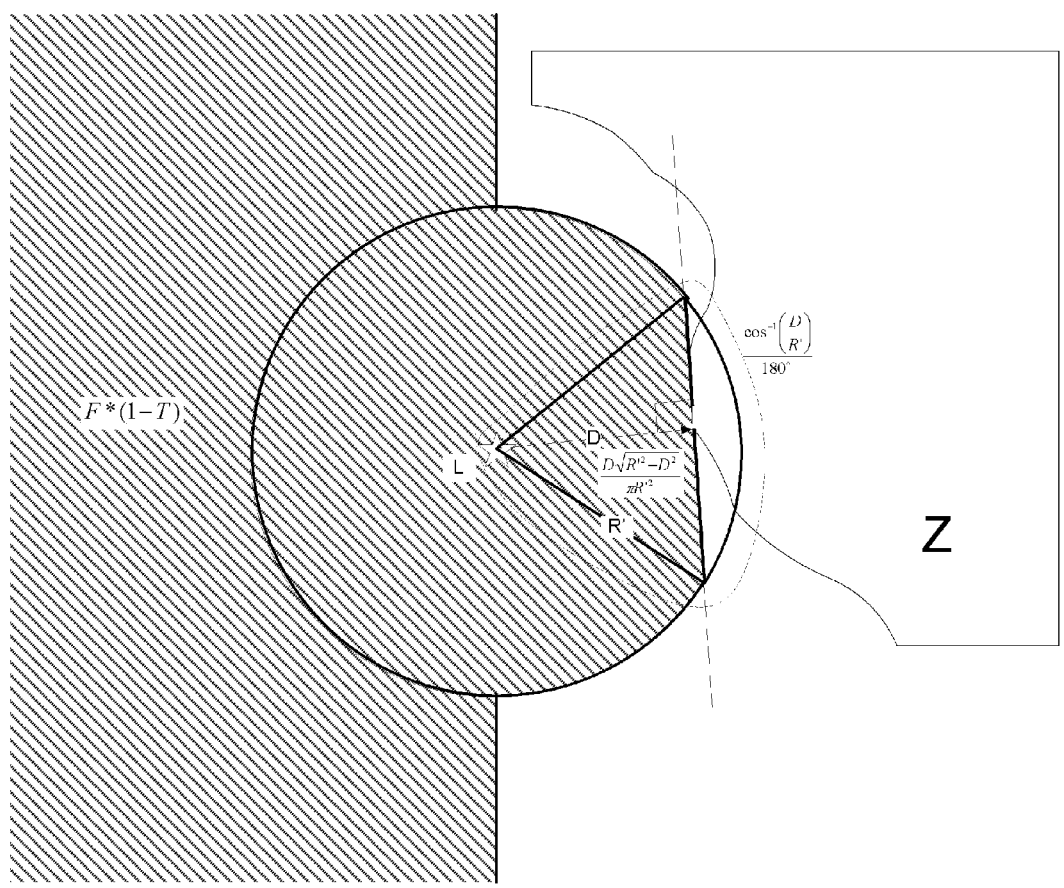
FIG. 11 illustrates the mathematical relationships of the secant geometries, according to some embodiments of the present invention.

FIG. 11 illustrates the mathematical relationships of the secant geometries, according to some embodiments of the present invention. In some embodiments, the following equation applies.

$$H = T * \left(1 - \left[\frac{\cos^{-1}\left(\frac{D}{R'}\right)}{180°} - \frac{D\sqrt{R'^2 - D^2}}{\pi R'^2}\right]\right) + F * (1 - T)$$

The first term accounts for the likelihood that the actual location is within the uncertainty circle, on the same side of the boundary as the location estimate, i.e., the shaded portion of the circle in FIG. 11. The second term [F*(1−T)] accounts for the possibility that the actual location is outside the uncertainty circle, and outside the boundary. Within the first term, the cosine calculation accounts for the pie slice containing the secant; the square root calculation accounts for the triangular area within the pie slice; the difference between the two is the estimate of the portion of the circle's area that lies across the boundary from L, i.e., the unshaded portion of the circle in FIG. 11.

Figure 12:
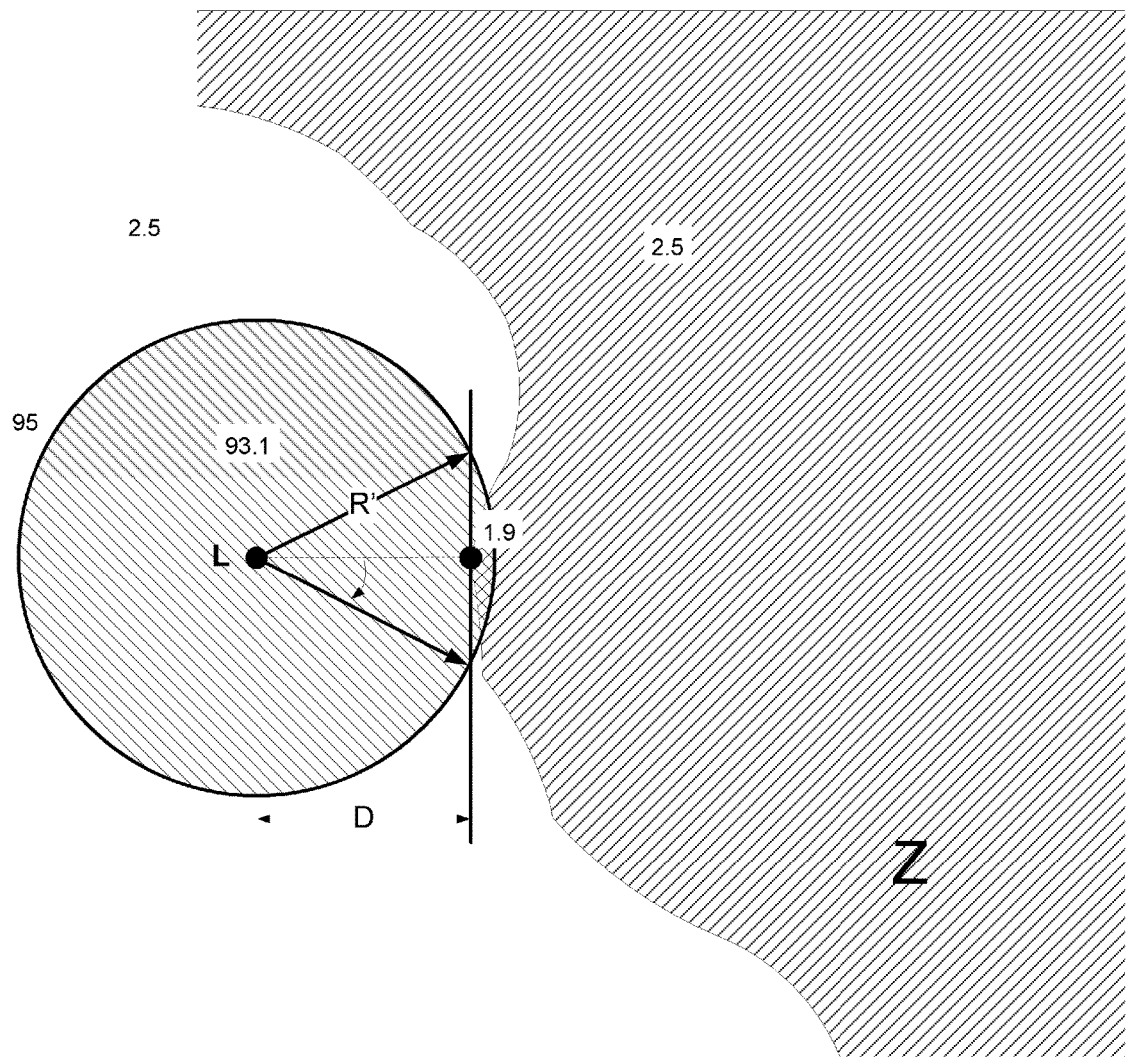
FIG. 12 shows an example of the secant method in practice, according to some embodiments of the present invention.

FIG. 12 shows an example of the secant method in practice, according to some embodiments of the present invention. In this example, T is given as 95%, so there is a 95% likelihood that the actual location lies within the R' circle. Here, D is 0.9 the length of R', resulting in an angle of 25.8 degrees, and approximately 1.9% likelihood that the actual location lies to the right of the secant line (i.e., across the boundary) but still within the circle. With F=0.5, the approximate likelihood that the actual location lies outside the circle and across the boundary from L is 0.5*(1−0.95) =2.5%. Thus the likelihood that the actual location lies on the same side of the boundary as the location estimate is

1−(0.019+0.025)=95.6%.

This exceeds the decision threshold of 95%, so a definitive OUT decision is reached (e.g., in block 908 of FIG. 9).

Referring back to FIG. 9, if H is not greater than the decision threshold T, it is checked in block 910 to see whether the process is done (again, possibly based on the needs of the consuming application). If deemed done, the location is indicated as unknown, in block 912. If H is not greater than the decision threshold T and the process is not done (910), the process returns to re-estimating H, in block 902.

Annulus Method of Estimation

Figure 13:
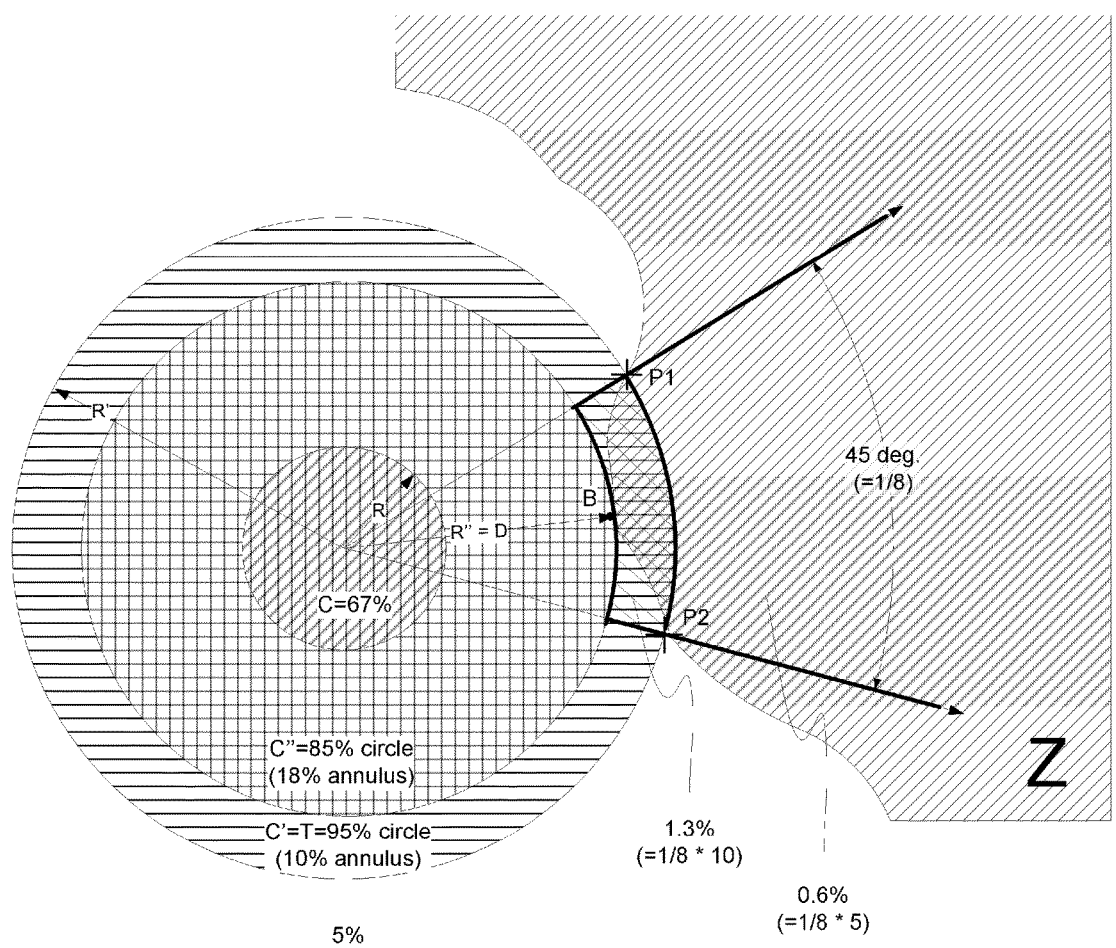
FIG. 13 illustrates an exemplary geometry associated with a conclusive annulus-based containment determination, according to some embodiments of the present invention.
Figure 14:
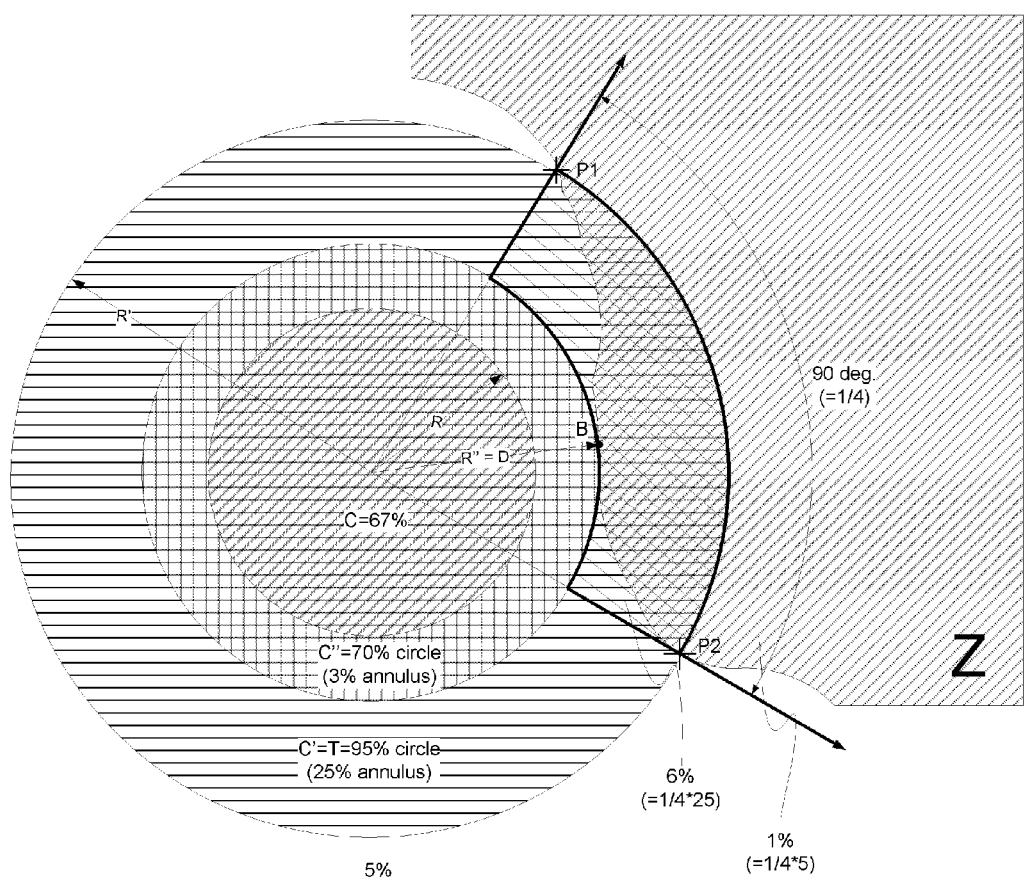
FIG. 14 illustrates an exemplary geometry associated with an inconclusive annulus-based containment determination, according to some embodiments of the present invention.

FIG. 13 illustrates exemplary geometry associated with a conclusive annulus-based containment determination, and FIG. 14 illustrates exemplary geometry associated with an inconclusive annulus-based containment determination, according to some embodiments of the present invention. As shown in FIG. 13 and FIG. 14, an annulus method may be used to calculate a further enhanced estimate of the likelihood that the actual location is within the boundary. In this method another radius value R" is used and set equal to D (the distance from estimated location L to the closest point B on the boundary Z). The confidence C" that the actual location is within R" is then calculated (based on the characteristics of the location system that provided the location estimate). The two points of intersection P1 and P2 of the circle at R' (the circle encompassing the actual location at the confidence threshold T) and the boundary Z are also identified. (The case where there are more than two such points is discussed below.).

The rays from the estimated location through P1 and P2 form an angle. Simple mathematical calculation yields the likelihood that the actual location falls within the annulus segment formed by the angle and circles at R' and R", and the likelihood that the actual location falls in the area bounded by the two rays, outside the annulus. These two areas yield an estimate of the likelihood that the actual location falls on the other side of the boundary from the estimated location.

Figure 15:
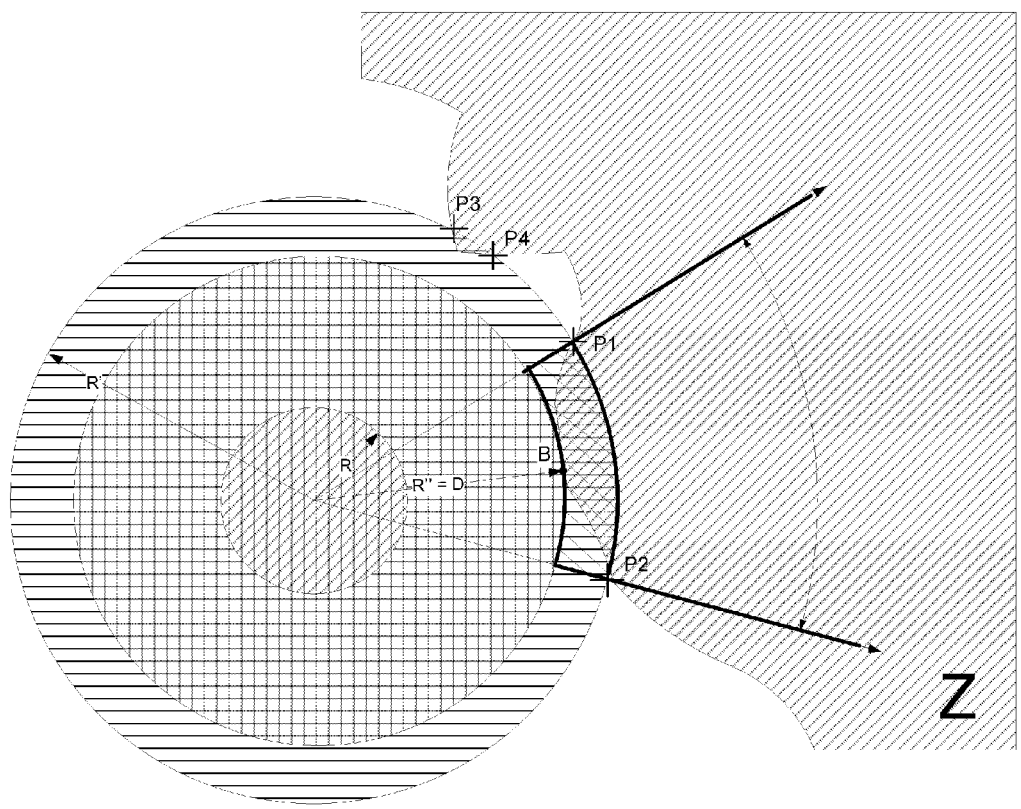
FIG. 15 shows an example geometry where the boundary overlaps the annulus in more than one area.

As an example, where the boundary Z intersects the R" circle at more than two points is shown in FIG. 15. In this example, the two points closest to B are used by the algorithm, and any other intersection points are ignored.

Consider the example in FIG. 13, where the original estimate is provided with an uncertainty radius of R and a confidence C of 67%. The decision threshold is 95%, but the 95% circle formed by R' crosses the boundary Z, precluding a stage 2 decision. R"=D produces another circle, with the confidence C" calculated to equal 85%. (The likelihood that the actual user location is in the area of the annulus created by this circle and the circle formed by R' is 95−85=10%.). P1 and P2 are identified, and the resulting angle is 45° (⅛ of 360°). The likelihood that the actual location lies within the annulus segment between P1 and P2 is ⅛ of 10%, and the likelihood that the actual location lies between the rays outside the segment is ⅛ of the 5% outside the C' 95% circle formed by R'. Adding the two likelihoods, and subtracting from 100%, yields ~98% likelihood that the actual location is on the same side of the boundary as the estimated location. This exceeds the 95% decision threshold, so in this example the algorithm would produce a definitive decision of "OUT."

It can be seen by this example that the calculations are much simpler than ones that would account for every twist and turn of the boundary Z. This process "rounds up" the likelihood that the actual location lies within the annulus and across the boundary, but typically "rounds down" the likelihood that the actual location lies outside the annulus and across the boundary. These two approximation errors usually offset each other to some degree, resulting in a fairly accurate approximation of the containment likelihood H.

Now consider a similar example illustrated in FIG. 14, where the original estimate is provided with a confidence C of 67%. The decision threshold is again given as 95%, and the 95% circle formed by R' crosses the boundary Z, again precluding a definitive decision in stage 2. R"=D produces another circle, with the confidence C" now calculated to equal 70%. (The likelihood that the actual user location is in the area of the annulus created by this circle and the circle formed by R' is 95−70=25%.). P1 and P2 are identified, and the resulting angle is now 90° (¼ of 360°). The likelihood that the actual location lies in the annulus segment between P1 and P2 is ¼ of 25%, and the likelihood that the actual location lies between the rays outside the segment is ¼ of the 5% outside the circle formed by W. Adding the two likelihoods, and subtracting from 100%, yields ~93% likelihood that the actual location is on the same side of the boundary as the estimated location. This does not exceed the decision threshold, so in this example, the process does not produce a conclusive IN/OUT decision. Added information from terrain, morphology (e.g., road layout), etc., or other input estimates, could be used to assist in making a possible definitive conclusion in this case.

Alternate Method for Estimating Outlying Points

Figure 16:
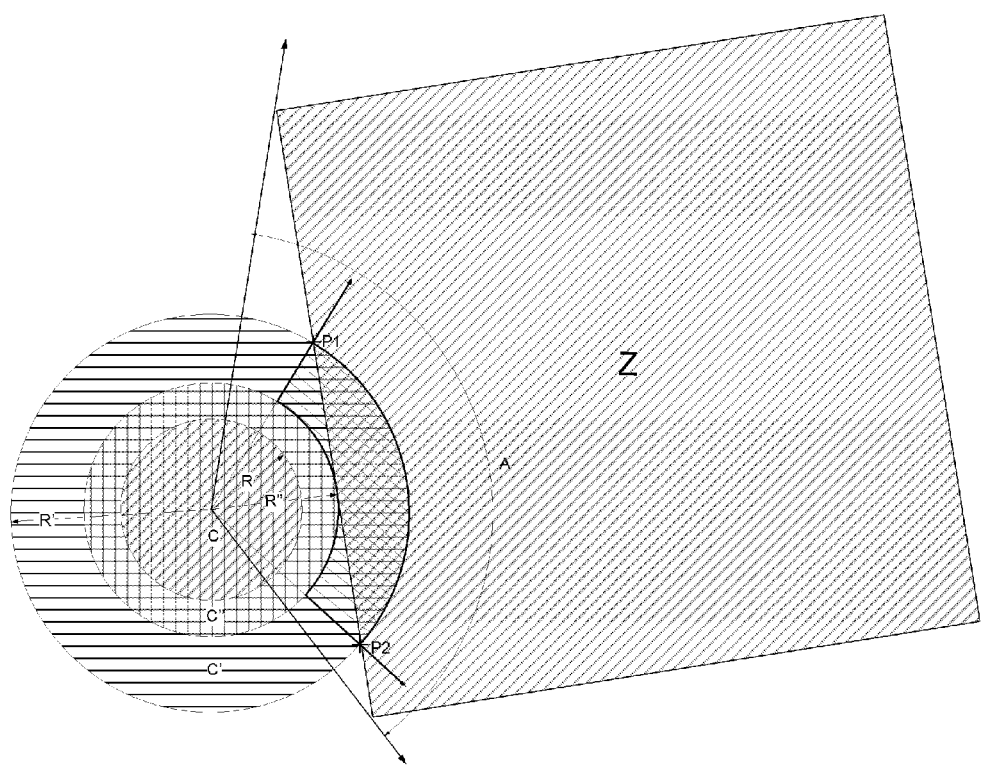
FIG. 16 illustrates a geometry for estimating the likelihood that the actual location lies outside the annulus but inside the boundary area, according to some embodiments of the present invention.

FIG. 16 illustrates an alternate method for estimating the likelihood that the actual location lies outside a circle (in this case the circle formed by R') and inside a boundary (Z). A is the smallest angle with apex at the center of the circle and encompassing Z. The proportion A/360° is an estimate of the fraction of outlying points inside Z. This estimate may be more accurate than the P1-P2 angle described above in conjunction with the annulus method, or the arbitrary choice of a fraction F described above in conjunction with the secant method.

Some embodiments of the present invention may further include a selection function. In the examples above, a single input estimate is considered. In practice, multiple input estimates may be available. The selection function chooses one among the available estimates for use by the first processing stage. The selection is made based on known characteristics (e.g., cost, quality) of the systems offering the input estimates, considering selection criteria. For example, the lowest-cost, or highest-confidence, estimate may be chosen, or a selection may be made that combines these qualities. Other characteristics, e.g., latency, may be considered.

Some embodiments of the present invention may further include a recursion function. The objective of the recursion function is to reduce the occurrences of inconclusive results. When the one stage of the processing generates an inconclusive output, the recursion function determines if another input estimate is available that might produce a more conclusive (IN or OUT) result. For example, if a low-cost, low-quality input estimate resulted in an inconclusive result, the recursion function would check to see if a higher-confidence (and probably higher-cost) input estimate is available. If so, the method of the invention is repeated using the new selection criteria in the technology selection function.

Figure 17:
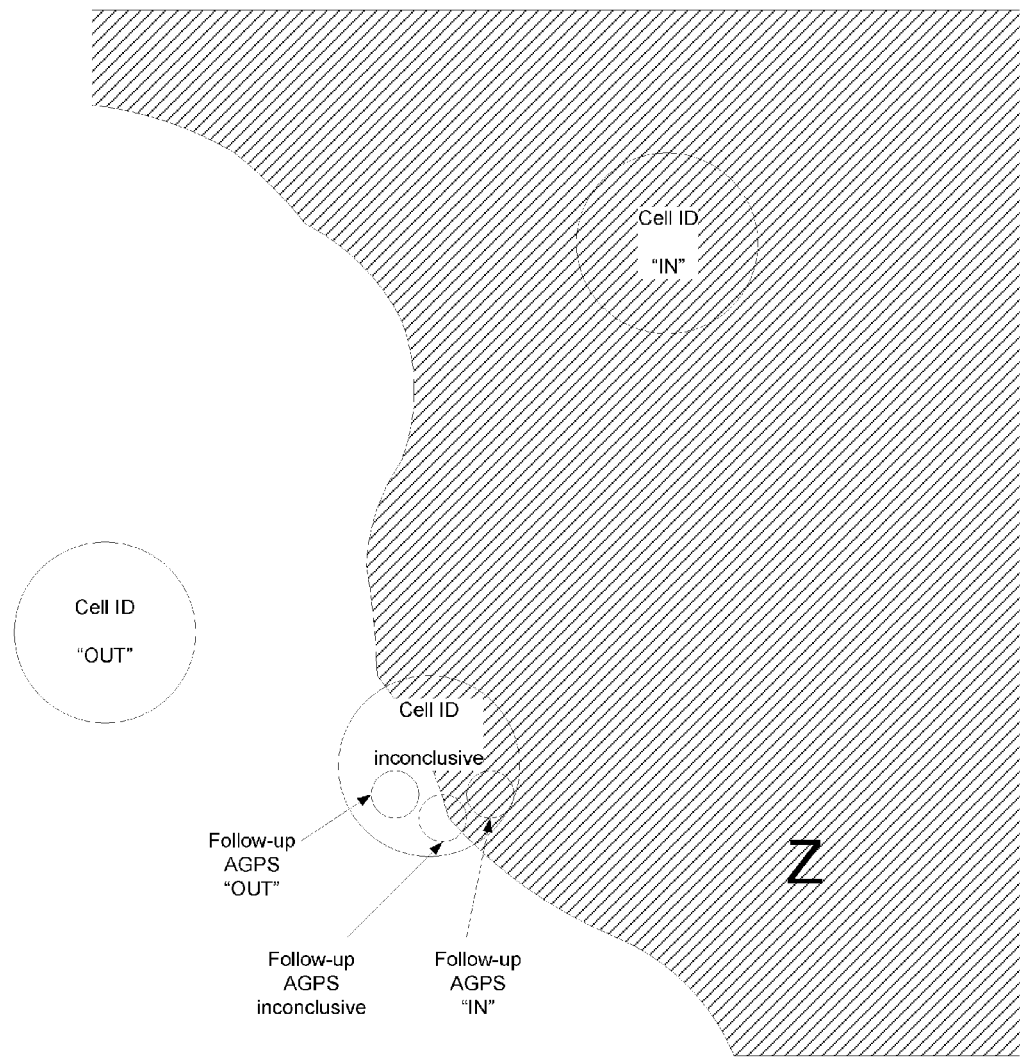
FIG. 17 illustrates an example of a recursion process, according to some embodiments of the present invention.

FIG. 17 illustrates an example of a recursion process, according to some embodiments of the present invention. Consider three location estimates of type "Cell ID," i.e., there is a high input uncertainty based on the antenna coverage area of a cellular base station. The circles represent the location and uncertainty. The hashed area Z represents the geographic boundary. In the case of the leftmost circle, the location estimate (center of the circle) is outside the geographic boundary and likelihood values associated with the location estimate is relatively low. The system in this case produces an output of OUT.

In the case of the rightmost circle, the location estimate (center of the circle) is inside the geographic boundary and likelihood values associated with the location estimate is relatively high. The system in this case produces an output of INSIDE.

In the case of the lowest circle, the location estimate (center of the circle) is near the geographic boundary relative to the input uncertainty, resulting in an inconclusive initial result. The system in this case produces a preliminary output of UNKNOWN. However, consider the case where a more accurate source of location estimates is available, in this case AGPS, based on measurements of received satellite signals. A follow-up location estimate may be requested. Now, with new location estimate with a higher confidence level and less uncertainty, it is more likely that a conclusive IN/OUT determination will result.

Figure 18A:
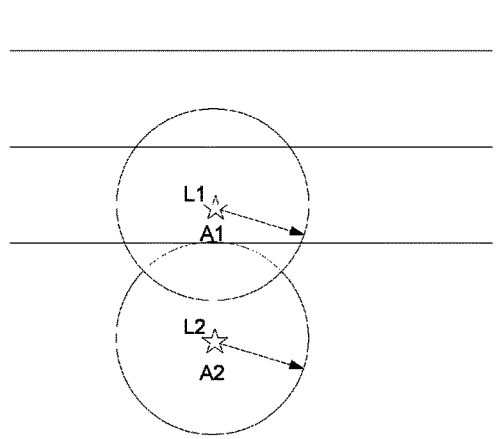
FIGS. 18A and 18B illustrate an example of a reconciled estimate, according to some embodiments of the present invention.
Figure 18B:
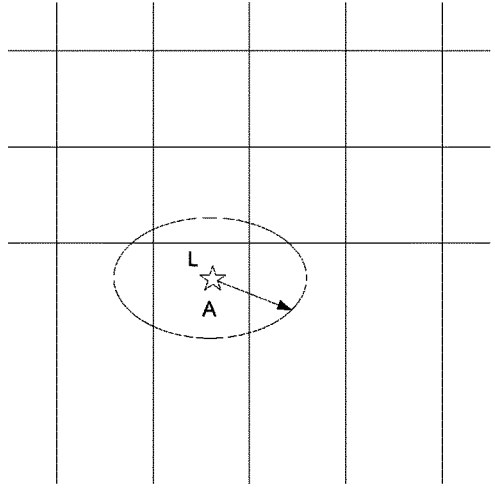
Figure 11:
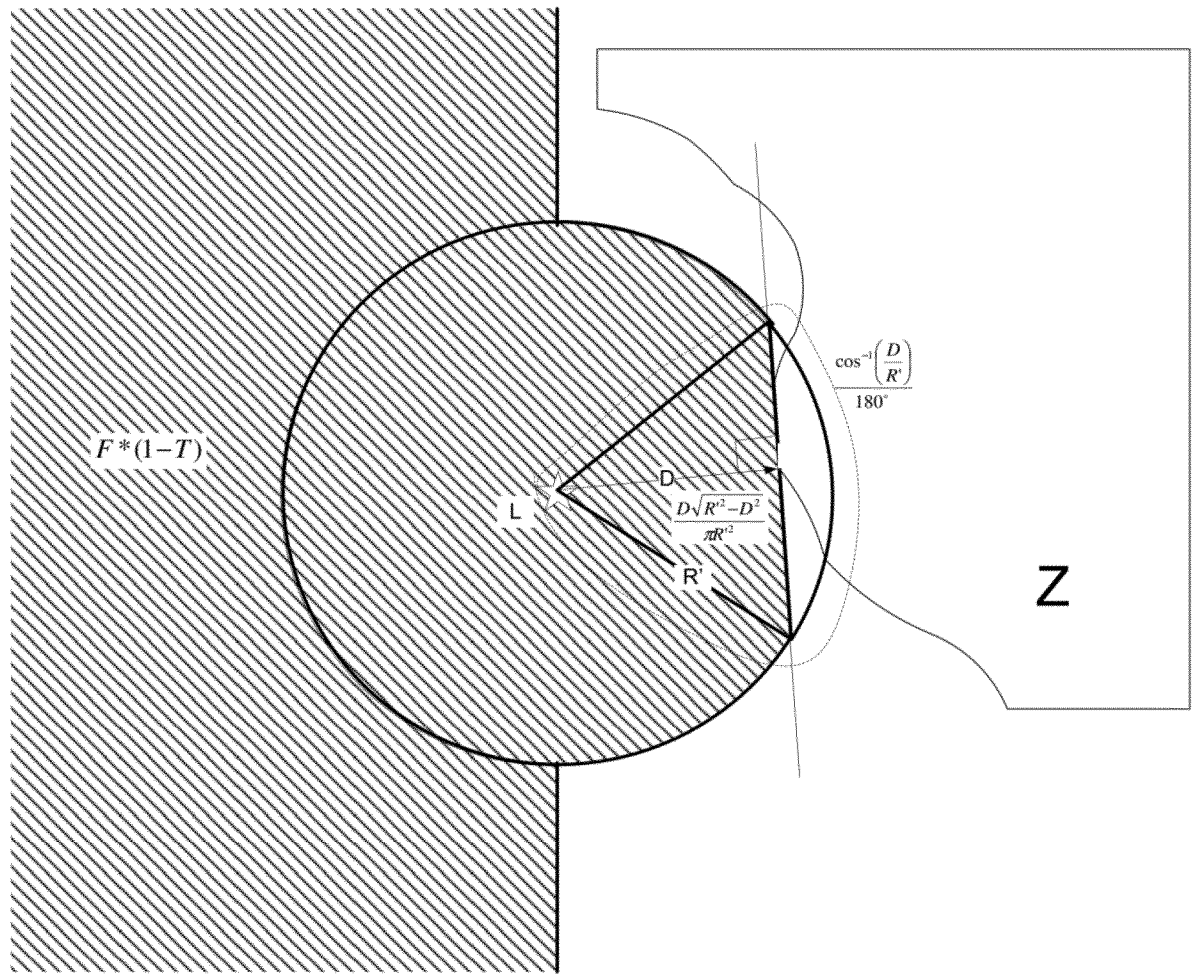

Some embodiments of the present invention may further include a reconciliation function. In these embodiments (which may be used with the other functions described above), the uncertainty adjustment function generates a separate output uncertainty for each of multiple input estimates, all with the same normalized confidence level. The output uncertainties are received by the reconciliation function, which uses the output uncertainties and location estimates to calculate a reconciled output uncertainty and a reconciled location estimate. In this case, both the reconciled location estimate and the reconciled output uncertainty, both illustrated in FIG. 18B may differ from any of the received location estimate data and input (unreconciled) uncertainties illustrated in FIG. 18A. The reconciled uncertainty area (illustrated in FIG. 18B) may not be a circle.

References used to indicate variables in the above discussion are summarized and listed in Table 1 below.

TABLE 1

| | Key |
|---|---|
| L | location estimate |
| R | Uncertainty |
| C | Confidence |
| Z | Boundary |
| B | Point on Z closest to L |
| D | Distance from L to B |
| N | Default multiplier used in stage 1 processing |
| H | Calculated likelihood of containment |
| T | Likelihood threshold |
| F | Fraction of area outside a circle allocated a priori to points on the same side of the boundary as L |

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for calculating whether an actual location of a target device is on one side of a boundary zone, the method comprising:
receiving a wireless signal indicative of an estimated location of the target device, from an application being executed by a processor;
receiving a signal indicative of a desired confidence level for the estimated location of the target device;
calculating a shortest distance from the estimated location to the boundary zone;
forming a first circle with radius D, centered at the estimated location, where D is the shortest distance from the estimated location to the boundary zone;
forming a second circle with radius R', centered at the estimated location, wherein R' is determined in such a way so that a likelihood that the actual location is inside the second circle equals or exceeds the desired confidence level;
forming an angle with an apex at the estimated location and rays passing through two closest points to the estimated location where the second circle intersects the boundary zone;
using a size of an annulus formed by the first circle, the second circle, and the rays to calculate an in/out estimate whether the actual location lies on the same side of the boundary zone as the estimated location, in real time; and
transmitting said in/out estimate to said application being executed by said processor, wherein the method is performed by one or more processors.

2. The method of claim 1, wherein the desired confidence level is a desired estimated probability that the actual location of the target device is within an uncertainty zone.

3. The method of claim 2, wherein the desired confidence level is constant for estimated locations received from a particular source.

4. The method of claim 1, further comprising receiving a second estimated location of the target device; and selecting the received estimated or the second estimated location of the target device as the estimated location for further processing.

5. The method of claim 4, wherein said selection is made based on cost or quality of the source from where the estimated or the second estimated location of the target device is received.

6. The method of claim 1, further comprising receiving terrain or morphology information; and utilizing the received terrain or morphology information, in addition to said size of the annulus, to estimate whether the actual location lies on the same side of the boundary zone as the estimated location.

7. A method for calculating whether an actual location of a target device is on one side of a boundary zone, the method comprising:
receiving a wireless signal indicative of an estimated location L of the target device, from an application being executed by a processor;
receiving a desired confidence level, from an application being executed by a processor;
calculating a distance D, where D is the shortest distance from the estimated location to the boundary zone;
forming a circle with radius R', centered at the estimated location, wherein R' is determined in such a way so that a likelihood that the actual location is inside the circle equals or exceeds the desired confidence level;
forming a secant, perpendicular to D, passing through the point where D intersects the boundary zone;
using a size of an area bounded by the circle and the secant to estimate whether the actual location lies on the same side of the boundary zone as the estimated location, in real time; and
transmitting said estimate to said application being executed by said processor, wherein the method is performed by one or more processors.

8. The method of claim 7, wherein the desired confidence level is a desired estimated probability that the actual location of the target device is within an uncertainty zone.

9. The method of claim 8, wherein the desired confidence level is constant for estimated locations received from a particular source.

10. The method of claim 7, further comprising receiving a second estimated location of the target device; and selecting the received estimated or the second estimated location of the target device as the estimated location for further processing.

11. The method of claim 10, wherein said selection is made based on cost or quality of the source from where the estimated or the second estimated location of the target device is received.

12. The method of claim 7, further comprising receiving terrain or morphology information; and utilizing the received terrain or morphology information, in addition to said size of the annulus, to estimate whether the actual location lies on the same side of the boundary zone as the estimated location.

\* \* \* \* \*

UNITED STATES PATENT AND TRADEMARK OFFICE
CERTIFICATE OF CORRECTION

PATENT NO. : 9,978,019 B2
APPLICATION NO. : 14/264655
DATED : May 22, 2018
INVENTOR(S) : Khaled I. Dessouky et al.

Page 1 of 2

It is certified that error appears in the above-identified patent and that said Letters Patent is hereby corrected as shown below:

In the Drawings

Delete Drawing Sheet 10 and substitute therefore the Drawing Sheet, consisting of FIG. 11, as shown on the attached page FIG. 11, Sheet 10 of 17:

Delete " $\dfrac{\cos^{-1}\left(\dfrac{D}{R'}\right)}{180°}$ "

Insert -- $\dfrac{\cos^{-1}\left(\dfrac{D}{R'}\right)}{180°}$ --

Signed and Sealed this
Thirtieth Day of July, 2019

Andrei Iancu
*Director of the United States Patent and Trademark Office*